United States Patent Office 3,096,345
Patented July 2, 1963

3,096,345
ACETAL AND KETAL PHOSPHITES
Ingenuin Hechenbleikner and Kenneth R. Molt, Cincinnati, Ohio, assignors to Carlisle Chemical Works Inc., Reading, Ohio, a corporation of Ohio
No Drawing. Filed Aug. 3, 1962, Ser. No. 214,508
32 Claims. (Cl. 260—340.7)

The present invention relates to novel acetals and ketals.

In the preparation of esters of polyhydric alcohols with acids of phosphorus such as phosphorus acid or phosphoric acid there is a tendency to form polymeric materials as shown for example in Sander Patent 2,978,478 and Fierce Patent 3,005,007. Thus in the latter patent in Example 1 the product contained only 14.8% whereas the theoretical phosphorus content of the monomeric phosphate is 22.8%.

It is an object of the present invention to develop a method for preparing monomeric phosphites of polyhydric alcohols having at least three hydroxyl groups. Such phosphites are convertable to the corresponding phosphates by conventional oxidative procedures.

Another object is to prepare novel heterocyclic acetal and ketal phosphites.

A further object is to prepare novel open chain acetal and ketal phosphites.

Still further objects and the entire scope of applicability of the present invention wil become apparent from the detailed description given hereinafter; it should be understood, however, that the detailed description and specific example, while indicating preferred embodiments of the invention, are given by way of illustration only, since various changes and modifications within the spirit and scope of the invention will become apparent to those skilled in the art from this detailed descritpion.

It has now been found that these objects can be attained by preparing novel acetals and ketals having one of the formulae

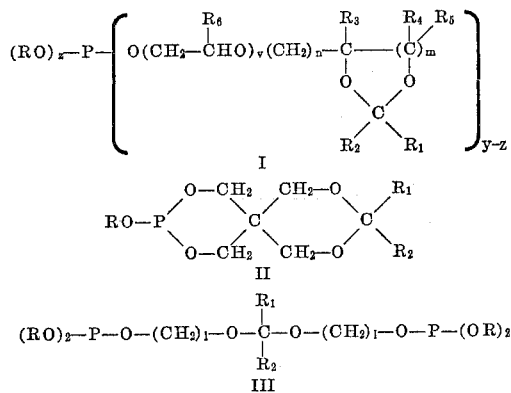

In the above formulae R is alkyl, including cycloalkyl, alkenyl, aryl or haloaryl, $R_1$ is alkyl, aryl, haloaryl or nitroaryl, $R_2$ is hydrogen, alkyl, aryl, haloaryl or nitroaryl, or $R_2$—C—$R_1$ is an alicyclic, i.e. a cycloalkyl, group, $R_3$ is hydrogen, alkyl or aryl, $R_4$ is hydrogen or alkyl, $R_5$ is hydrogen or alkyl, $R_6$ is hydrogen, methyl or ethyl, $v$ is 0 or an integer, e.g., from 1 to 100, $n$ is an integer between 1 and 10, $m$ is 1 or 2, $l$ is an integer of at least 4, e.g. 4 to 20, $z$ is zero, 1 or 2 and $y$ is 3.

Also there can be prepared compounds having the formula

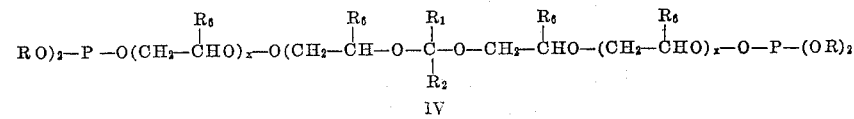

where R is as defined above, $R_6$ is as defined above and $x$ is an integer of at least 1, e.g. from 1 to 100.

There are also embraced within the present invention the phosphite esters of diacetals and ketals of hexitols such as sorbitol and mannitol. Typical of such materials are compounds having the formula:

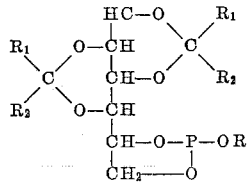

where R, $R_1$ and $R_2$ are as defined above.

In Formula V no attempt has been made to show the position of the hydrogen atoms on the asymmetric carbon atoms. The position of the acetal and ketal groups also can be varied so long as there are two such groups in the molecule.

The compounds of the present invention are useful as stabilizers for halogen containing vinyl resins, e.g. polyvinyl chloride and copolymers of vinyl chloride with minor amount of other materials such as vinyl acetate, acrylonitrile, etc. They also are useful as antioxidants for materials such as polyproylene.

A particularly important use for the acetals and ketals of the present invention is to hydrolyze them to give hydroxyl containing phosphites. Thus a compound having the formula:

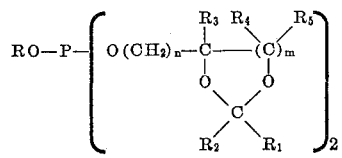

When hydrolyzed with aqueous acid gives a secondary phosphite having the formula

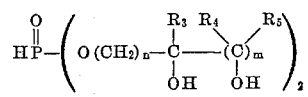

The byproducts are phenol and the aldehyde or ketone having the formula

The symbols have the same definitions as previously set forth. This provides a simple and effective way of forming such monomeric phosphites containing a plurality of alcoholic groups without any danger of premature polymerization. The hydrolyzed phosphites are useful for preparing polyurethanes by reaction with organic isocyanates, e.g., toluene diisocyanate. The polyurethanes can be foamed or elastomeric.

Phosphates corresponding to the hydrolyzed phosphites can be prepared if prior to the acid hydrolysis of the acetal or ketal it is oxidized with alkaline hydrogen peroxide. These phosphates have numerous uses as shown in Gilbert Patent 2,789,124, for example. They can also be reacted with organic polyisocyanates to form foamed or elastomeric polyurethanes.

The novel compounds of the present invention are prepared by reacting a phosphite of the formula $(RO)_3P$ with an acetal or ketal having one of the formulae

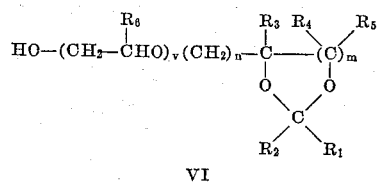
VI

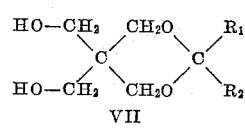
VII

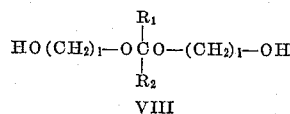
VIII

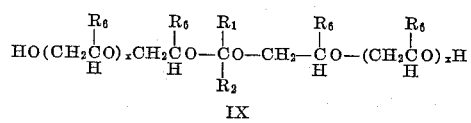
IX

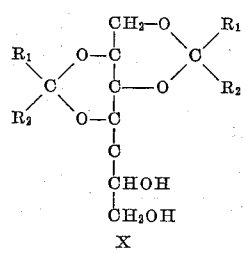
X

In the formulae R, $R_1$, $R_2$, $R_3$, $R_4$, $R_5$, $R_6$, $x$, $l$, $m$ and $n$ are as previously defined.

The transesterification of the triaryl phosphite, trialkyl phosphite or the like with the acetal or ketal of Formulae VI through X is preferably carried out in the presence of 0.01–10% of an alkaline catalyst such as sodium methylate, sodium ethylate, sodium phenolate, sodium cresylate, sodium decylate, sodium octadecylate, potassium phenolate, potassium octylate, lithium, ethylate, sodium salt of 2-methyl-2-ethyl-4-hydroxymethyl dioxolane, potassium salt of 2,2-dimethyl-4-hydroxymethyl dioxolane as well as the alkali metal salts of the other acetals of Formulae VI through X. The alkaline catalyst usually will have a pH of at least 11 in a 0.1 N solution. The phenol or monohydric alcohol formed in the reaction is preferably removed by distillation, usually at reduced pressure, e.g., 5–20 mm.

In place of the alkaline catalyst there can be used 0.1–10% of a secondary phosphite, e.g. diphenyl phosphite, dicresyl phosphite, didecyl phosphite or dimethyl phosphite.

In making the compounds of Formula I when $z$ is zero there should be employed at least 3 mols of the starting acetal or ketal of Formula VI per mol of the starting phosphite, e.g., triaryl phosphite, used. Preferably an excess, e.g., a 20% excess of the acetal or ketal is employed. In preparing compounds of Formula I when $z$ is 1 there are used 2 mols of the starting acetal or ketal per mol of starting phosphite. In preparing compounds of Formula I when $z$ is 2 there is used 1 mol of the starting acetal or ketal per mol of starting phosphite.

In preparing compounds of Formula II (or V) there is used 1 mol of the starting acetal or ketal of Formula VII (or X) per mol of the starting phosphite, e.g. a triaryl phosphite.

In preparing the compounds of Formulae III and IV there is used 1 mol of the acetal or ketal of Formulae VIII or IX for each 2 mols of the starting phosphite.

As starting phosphites there can be used triphenyl phosphite, tri o-cresyl phosphite, tri p-cresyl phosphite, tri m-cresyl phosphite, tri xylenyl phosphite, tri p-butylphenyl phosphite, tri α-naphthyl phosphite, bis phenyl decyl phosphite, phenyl bis decyl phosphite, tris decyl phosphite trimethyl phosphite, triethyl phosphite, tri octadecyl phosphite, tris cyclohexyl phosphite, tri oleyl phosphite, triallyl phosphite, tri o-chlorophenyl phosphite, dibutyl phenyl phosphite, tri p-chlorophenyl phosphite, tri m-chlorophenyl phosphite, tri bromophenyl phosphite, trilauryl phosphite, tri β-naphthyl phosphite.

To make the starting acetals or ketals of Formula VI there are reacted a polyhydric alcohol having three hydroxyl groups such as glycerine, 1,2,6-hexanetriol, trimethylolethane, trimethylolpropane, trimethylolbutane, trimethylol phenyl methane, trimethylol butylphenyl methane, 1,2,4-butanetriol, 1,2,3-butanetriol, 1,2,3-pentanetriol, 2-methyl-1,2,3-butanetriol with an aldehyde or ketone such as formaldehyde, acetaldehyde, propionaldehyde, butyraldehyde, isobutyraldehyde, valeraldehyde, lauraldehyde, stearaldehyde, isovalaraldehyde, heptaldehyde, benzaldehyde, acrolein, crotonaldehyde, oleic aldehyde, o-tolulaldehyde, p-tolualdehyde, α-naphthaldehyde, β-naphthaldehyde, p-chlorobenzaledehyde, o-chlorobenzaldehyde, o-nitrobenzaldehyde, p-nitrobenzaldehyde, 2,4-dichloro benzaldehyde, m-bromo benzaldehyde, m-nitrobenzaldehyde, m-chlorobenzaldehyde, hexahydrobenzaldehyde, acetone, methyl ethyl ketone, methyl-n-propyl ketone, diethyl ketone, hexanone-2, hexanone-3, methyl t-butyl ketone, di n-propyl ketone, diisopropyl ketone, diisobutyl ketone, di n-amyl ketone, stearanone, cyclohexanone, cyclopentonone, benzophenone, acetophenone, propiophenone, methyl cyclohexanone, cycloheptanone, cyclooctanone. The reaction between the trihydric alcohol and aldehyde or ketone is carried out under anhydrous conditions in the presence of a small amount, e.g., 0.1–5% of an acid such as hydrochloric acid or p-toluenesulfonic acid based on the amount of alcohol reactant. Many of the starting acetals and ketals are old as shown in Gilbert Patent 2,789,124 and Hopff Patent 2,095,814. The other starting acetals and ketals can be prepared by conventional procedures such as those of the Gilbert and Hopff patents. The starting acetals and ketals of Formula VI which have at least one

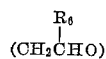

group can be prepared in the manner of Hopff by adding an alkylene oxide such as ethylene oxide, propylene oxide or butylene oxide to the acetal or ketal of a trihydric alcohol and an aldehyde or ketone. The greater the number of mols of alkylene oxide used per mol of acetal or ketal the greater the number of

groups in the product.

Examples of starting acetals or ketals within Formula VI include 2-methyl-2-ethyl-4-hydroxymethyl dioxolane,
(2-methyl-2-ethyl-4-methylol-1,3-dioxacyclopentane),
2,5-dimethyl-2-ethyl-5-hydroxymethyl m-dioxane,
(2,5-dimethyl-2-ethyl-5-methylol-1,3-dioxacyclohexane),
2,2,5-trimethyl-5-hydroxymethyl m-dioxane,
2,2-dimethyl-4-hydroxymethyl dioxolane,
4-hydroxymethyl dioxolane,
2-methyl 4-hydroxymethyl dioxolane,
2-ethyl 4-hydroxymethyl dioxolane,
2-propyl 4-hydroxymethyl dioxolane,
2-isopropyl-4-hydroxymethyl dioxolane,
2-undecyl-4-hydroxymethyl dioxolane,
2-heptadecyl-4-hydroxymethyl dioxolane, 2-heptadecenyl-4-hydroxymethyldioxolane (from oleic aldehyde and glycerol),
2-vinyl-4-hydromethyl dioxolane,
2-phenyl-4-hydroxymethyl dioxolane,
2-p-methylphenyl-4-hydroxymethyl dioxolane,
2-o-chlorophenyl-4-hydroxymethyl dioxolane,
2-m-nitrophenyl-4-hydroxymethyl dioxolane,
2-α-naphthyl-4-hydroxymethyl dioxolane,
2-m-bromophenyl-4-hydroxymethyl dioxolane,
2-methyl-2-propyl-4-hydroxymethyl dioxolane,
2,2-diethyl-4-hydroxymethyl dioxolane,
2-methyl-2-butyl-4-hydroxymethyl dioxolane,
2-ethyl-2-propyl-4-hydroxymethyl dioxolane,
2-methyl-2-t. butyl-4-hydroxymethyl dioxolane,
2,2-dipropyl-4-hydroxymethyl dioxolane,
2,2-diamyl-4-hydroxymethyl dioxolane,
2,2-diheptadecyl-4-hydroxymethyl dioxolane,
cyclic acetal from glycerol and cyclohexanone having the formula,

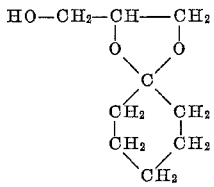

(3-hydroxymethyl-1,4-dioxaspiro (5,5) decane),
cyclic acetal from cyclopentanone and glycerol,
(3-hydroxymethyl-1,4-dioxaspiro (5,5) nonane),
2,2-diphenyl-4-hydroxymethyl-dioxolane,
2-methyl-2-phenyl-4-hydroxymethyl dioxolane,
2,2-dimethyl-4-hydroxyethoxymethyl dioxolane,
2,2-dimethyl-4-hydroxypropoxymethyl dioxolane,
2-methyl-2-ethyl-4-hydroxypolyethoxymethyl dioxolane wherein the polyethoxy contains 30 ethoxy groups,
2-methyl-2-ethyl-4-hydroxypolypropoxymethyl dioxolane wherein the polypropoxy contains 25 propoxy groups,
2-methyl-4-hydroxy (ethyl) ethoxymethyl dioxolane,
2,2-dimethyl-4-hydroxybutyl dioxolane,
2-methyl-2-ethyl-4-hydroxybutyl dioxolane,
4-hydroxybutyl dioxolane,
2-propyl-4-hydroxybutyldioxolane,
2,2,5-trimethyl-4-hydroxymethyl dioxolane,
2,2-dimethyl-5-ethyl-4-hydroxymethyl dioxolane,
2,4,5-trimethyl-2-ethyl-4-hydroxymethyl dioxolane,
2,5-dimethyl-5-hydroxymethyl m-dioxane,
2-methyl, 2,5-diethyl-5-hydroxymethyl m-dioxane,
2,2-dimethyl-5-propyl-5-hydroxymethyl m-dioxane,
2,2-dimethyl-5-heptadecyl-5-hydroxymethyl m-dioxane,
5-methyl-5-hydroxymethyl m-dioxane,
5-ethyl-5-hydroxymethyl m-dioxane,
2-methyl-5-methyl-5-hydroxymethyl m-dioxane,
2-methyl-5-ethyl-5-hydroxymethyl m-dioxane,
2-butyl-5-methyl-5-hydroxymethyl-m-dioxane,
2-isobutyl-5-ethyl-5-hydroxymethyl-m-dioxane,
2-phenyl-5-methyl-5-hydroxymethyl m-dioxane,
2-phenyl-5-ethyl-5-hydroxymethyl m-dioxane,
2-p-methylphenyl-5-methyl-5-hydroxymethyl m-dioxane,
2-o-chlorophenyl-5-ethyl-5-hydroxymethyl m-dioxane,
2-m-nitrophenyl-5-methyl-5-hydroxymethyl m-dioxane,
2,2-dimethyl-5-ethyl-5-hydroxymethyl m-dioxane,
2,2,5-trimethyl-5-hydroxymethyl m-dioxane,
2-methyl-2-phenyl-5-methyl-5-hydroxymethyl m-dioxane,
2,5-dimethyl-2-phenyl-5-hydroxymethyl m-dioxane,
2,2-diethyl-5-methyl-5-hydroxymethyl m-dioxane,
the cyclic ketal from cyclohexanone and trimethylolethane,
(3-methyl-3-hydroxymethyl-1,5-dioxaspiro (6,6) undecane),
the cyclic ketal from cyclohexanone and trimethylolpropane,
(3-ethyl-3-hydroxymethyl-1,5-dioxaspiro (6,6) undecane),
2-cyclohexyl-5-methyl-5-hydroxymethyl m-dioxane,
2,2-diamyl-5-ethyl-5-hydroxymethyl m-dioxane,
2,2-dimethyl-5-phenyl-5-hydroxymethyl m-dioxane.

Illustrative examples of compounds within Formula I are phenyl-bis (4-(2-methyl-2-ethyl-dioxolanyl)-methyl) phosphite [phenyl-bis (4-(2-methyl-2-ethyl-1,3-dioxacyclopentyl) methyl) phosphite], bis phenyl-4-(2-methyl-2-ethyl-1,3-dioxacyclopentyl) methyl phosphite, tris (4-(2-methyl-2-ethyl-1,3-dioxacyclopentyl) methyl) phosphite, o-cresyl bis-(4-(2-methyl-2-ethyl dioxolanyl)-methyl) phosphite, dimethyl-4-(2-methyl-2-ethyl-1,3-dioxacyclopentyl) methyl phosphite, decyl-bis (4-(2-methyl-2-ethyl-1,3-dioxacyclopentyl) methyl) phosphite, bis octadecyl-4-(2-methyl-2-ethyl-1,3-dioxacyclopentyl) methyl phosphite, oleyl-bis (4-(2-methyl-2-ethyl-1,3-dioxacyclopentyl) methyl) phosphite, bis p-butylphenyl-4-(2-methyl-2-ethyl-1,3-dioxacyclopentyl) methyl phosphite, α-naphthyl-bis (4-(2-methyl-2-ethyl-1,3-dioxacyclopentyl) methyl) phosphite, cyclohexyl-bis (4-(2-methyl-2-ethyl-1,3-dioxacyclopentyl) methyl) phosphite, bis o-chlorophenyl-4-(2-methyl-2-ethyl-1,3-dioxacyclopentyl) methyl phosphite, p-bromophenyl-bis (4-(2-methyl-2-ethyl-1,3-dioxacyclopentyl) methyl phosphite, 2',4'-dimethyl phenyl-bis (4-(2-methyl-2-ethyl-1,3-dioxacyclopentyl) methyl) phosphite, tris (5-(2,5-dimethyl-2-ethyl-1,3-dioxacyclohexyl) methyl) phosphite, phenyl-bis (5-(2,5-dimethyl-2-ethyl-1,3-dioxacyclohexyl) methyl) phosphite, bis phenyl-5-(2,5-dimethyl-2-ethyl-1,3-dioxacyclohexyl) methyl phosphite, m-cresyl-bis (5-(2,5-dimethyl-2-ethyl-1,3-dioxacyclohexyl) methyl) phosphite, dimethyl-5-(2,5-dimethyl-2-ethyl-1,3-dioxacyclohexyl) methyl phosphite, bis lauryl-5-(2,5-dimethyl-2-ethyl-1,3-dioxacyclohexyl) methyl phosphite, allyl-bis (5-(2,5-dimethyl-2-ethyl-1,3-dioxacyclohexyl) methyl) phosphite, bis o-decylphenyl-5-(2,5-dimethyl-2-ethyl-1,3-dioxacyclohexyl) methyl phosphite, bis β-naphthyl-5(2,5-dimethyl-2-ethyl-1,3-dioxacyclohexyl) methyl phosphite, cyclopentyl-bis (5-(2,5-dimethyl-2-ethyl-1,2-dioxacyclohexyl) methyl) phosphite, bis m-chlorophenyl-5-(2,5-dimethyl-2-ethyl-1,3-dioxacyclohexyl) methyl phosphite, dibutyl-5-(2,2,5-trimethyl-1,2-dioxacyclohexyl) methyl phosphite, butyl-bis (5-(2,2,5-trimethyl-1,3-dioxacyclohexyl) methyl) phosphite, tris (5-(2,2,5-trimethyl-1,3-dioxacyclohexyl) methyl) phosphite, phenyl-bis (5-(2,2,5-trimethyl-1,3-dioxacyclohexyl) methyl) phosphite, diphenyl-5-(2,2,5-trimethyl-1,3-dioxacyclohexyl) methyl phosphite, o-cresyl-bis (5-(2,2,5-trimethyl-1,3-dioxacyclohexyl)methyl) phosphite, tris (4-(2,2-dimethyl-1,3-dioxacyclopentyl) methyl) phosphite, phenyl-bis (4-(2,2-dimethyl-1,3-dioxacyclopentyl) methyl) phosphite, diphenyl-4-(2,2-dimethyl-1,3-dioxacyclopentyl) methyl phosphite, isobutyl bis (4-(2,2-dimethyl-1,3-dioxacyclopentyl)-methyl phosphite, tris (4-(1,3-dioxacyclopentyl) methyl) phosphite [tris 4-(dioxolanyl) methyl) phosphite], phenyl-bis (4-(1,3-dioxacyclopentyl) methyl) phosphite, bis octadecyl-4-(1,3-dioxacyclophenyl) methyl phosphite, tris (4-(2-methyl-1,3-dioxacyclopentyl) methyl) phosphite, diphenyl-4-(2-methyl-1,3-dioxacyclopentyl) methyl phosphite, ethyl-bis (4-(2-methyl-1,3-dioxacyclopentyl) methyl) phosphite, tris (4 (2-ethyl-1,3-dioxacyclopentyl) methyl) phosphite, phenyl-bis (4-(2-ethyl-1,3-dioxacyclopentyl) methyl) phosphite, bis oleyl-4-(2-ethyl-1,3-dioxacyclopentyl) methyl phosphite, tris (4 (2-propyl-1,3-dioxacyclopentyl) methyl) phosphite, diphenyl 4-(2-propyl-1,3-dioxacyclopentyl) methyl phosphite, decyl-bis (4-(2-propyl-1,3-dioxacyclopentyl) methyl) phosphite, tris (4-(2-isopropyl-1,3-dioxacyclopentyl) methyl) phosphite, phenyl-bis (4-(2-isopropyl-1,3-dioxacyclopentyl) methyl) phosphite, tris (4-(2-heptadecyl-1,3-dioxacyclopentyl)methyl) phosphite, phenyl-bis (4-(2-heptadecyl-1,3-dioxacyclopentyl) methyl) phosphite, dimethyl-4-(2-heptadecyl-1,3-dioxacyclopentyl) methyl phosphite, tris (4-(2-heptadecenyl-1,3-dioxacyclopentyl) methyl) phosphite, phenyl-bis (4-(2-heptadecenyl-1,3-dioxacyclopentyl) methyl) phosphite, tris (4-(2-vinyl-1,3-dioxacyclopentyl) methyl) phosphite, p-cresyl-bis (4-(2-vinyl-1,3-dioxacyclopentyl) methyl)

phosphite, diphenyl 4-(2-vinyl-1,3-dioxacyclopentyl) methyl phosphite, dodecyl-bis (4-(2-vinyl-1,3-dioxacyclopentyl) methyl) phosphite, tris (4-(2-phenyl-1,3-dioxacyclopentyl) methyl) phosphite, phenyl-bis (4-(2-phenyl-1,3-dioxacyclopentyl) methyl) phosphite, octyl-bis (4-(2-phenyl-1,3-dioxacyclopentyl) methyl) phosphite, tris (4-(2-p-methylphenyl-1,3-dioxacyclopentyl) methyl) phosphite, m-cresyl-bis (4-(2-p-methylphenyl-1,3-dioxacyclopentyl) methyl) phosphite, tris (4-(2-o-chlorophenyl-1,3-dioxacyclopentyl) methyl) phosphite, bis octadecyl-4-(2-o-chlorophenyl-1,3-dioxacyclopentyl) methyl phosphite, tris (4-(-2-m-nitrophenyl-1,3-dioxacyclopentyl) methyl) phosphite, phenyl-bis (4-(2-m-nitrophenyl-1,3-dioxacyclopentyl) methyl) phosphite, ethyl-bis (4-(2-m-nitrophenyl-1,3-dioxacyclopentyl) methyl) phosphite, tris (4-(2-α-naphthyl-1,3-dioxacyclopentyl) methyl) phosphite, phenyl-bis (4-(2-β-naphthyl-1,3-dioxacyclopentyl) methyl) phosphite, tris (4-(2-bromophenyl-1,2-dioxacyclopentyl) methyl) phosphite, tris (4-(2-methyl-2-propyl-1,3-dioxacyclopentyl) methyl) phosphite, phenyl-bis (4 (2-methyl-2-propyl-1,3-dioxacyclopentyl) methyl) phosphite, decyl-bis (4 (2-methyl-2-propyl-1,3-dioxacyclopentyl) methyl) phosphite, di p-cresyl-4 (2-methyl-2-propyl-1,3-dioxacyclopentyl) methyl phosphite, tris (4-2,2-diethyl-1,3-dioxacyclopentyl) methyl) phosphite, phenyl-bis (4 (2,2-diethyl-1,3-dioxacyclopentyl) methyl) phosphite, diamyl-4 (2,2-diethyl-1,3-dioxacyclopentyl) methyl phosphite, tris (4 (2-methyl-2-butyl-1,3-dioxacyclopentyl) methyl) phosphite, phenyl bis (4 (2-methyl-2-butyl-1,3-dioxacyclopentyl) methyl) phosphite, tris (4 (2-ethyl-2-propyl-1,3-dioxacyclopentyl) methyl) phosphite, methyl bis (4 (2-ethyl-2-propyl-1,3-dioxacyclopentyl) methyl) phosphite, tris (4 (2-methyl-2-t. butyl-1,3-dioxacyclopentyl) methyl) phosphite, diethyl-4 (2-methyl-2-t. butyl-1,3-dioxacyclopentyl) methyl phosphite, tris (4(2,2-dipropyl-1,3-dioxacyclopentyl) methyl) phosphite, phenyl-bis (4 (2,2-dipropyl-1,3-dioxacyclopentyl) methyl) phosphite, tris (4 (2,2-diamyl-1,3-dioxacyclopentyl) methyl) phosphite, tris (4 (2,2-diheptadecyl-1,3-dioxacyclopentyl) methyl)-phosphite, diphenyl-4 (2,2-diheptadecyl-1,3-dioxacyclopentyl) methyl phosphite, tris (3 (1,4-dioxaspiro (5,5) decyl) methyl) phosphite, phenyl-bis (3 (1,4-dioxaspiro (5,5) decyl) methyl) phosphite, diphenyl-3 (1,4-dioxaspiro (5,5) decyl) methyl phosphite, butyl-bis (3 (1,4-dioxaspiro (5,5) decyl) methyl) phosphite, tris (3 (1,4-dioxaspiro (5,5) nonyl) methyl) phosphite, tris (4 (2,2-diphenyl-1,3-dioxacyclopentyl) methyl) phosphite, phenyl-bis (4 (2,2-diphenyl-1,3-dioxacyclopentyl) methyl) phosphite, di o-cresyl-4 (2,2-diphenyl-1,3-dioxacyclopentyl) methyl phosphite, octyl-bis (4 (2,2-diphenyl-1,3-dioxacyclopentyl) methyl) phosphites, tris (4 (2-methyl-2-phenyl-1,3-dioxacyclopentyl) methyl) phosphite, methyl bis (4 (2-methyl-2-phenyl-1,3-dioxacyclopentyl) methyl) phosphite, diphenyl-4 (2-methyl-2-phenyl-1,3-dioxacyclopentyl) methyl phosphite, tris (4 (2,2-dimethyl-1,3-dioxacyclopentyl) propoxymethyl) phosphite, tris (4 (2-methyl-2-ethyl-1,3-dioxacyclopentyl) polyethoxymethyl) phosphite where the polyethoxy contains 30 ethoxy groups, tris (4 (2,2-dimethyl-1,3-dioxacyclopentyl) butyl)phosphite, phenyl-bis (4 (2,2-dimethyl-1,3-dioxacyclopentyl) butyl) phosphite, diethyl-4 (1,3-dioxacyclopentyl) butyl phosphite, methyl-bis (4 (2-methyl-1,3-dioxacyclopentyl) butyl) phosphite, phenyl-bis (4 (2-methyl-2-ethyl-1,3-dioxacyclopentyl) butyl) phosphite, tris (4 (1,3-dioxacyclopentyl) butyl) phosphite, tris (4 (2-methyl-1,3-dioxacyclopentyl) butyl) phosphite, tris (4 (2,2-diphenyl-1,3-dioxacyclopentyl) butyl) phosphite, tris (4 (2,2,5-trimethyl-1,3-dioxacyclopentyl) methyl) phosphite, phenyl-bis (4 (2,2,5-trimethyl-1,3-dioxacyclopentyl) methyl) phosphite, propyl-bis (4 (2,2,5-trimethyl-1,3-dioxacyclopentyl) methyl) phosphite, tris (4 (2,2-dimethyl-5-ethyl-1,3-dioxacyclopentyl) methyl) phosphite, tris (4 (2,4,5-trimethyl-2-ethyl-1,3-dioxacyclopentyl) methyl) phosphite, phenyl bis (4 (2,4,5-trimethyl-2-ethyl-1,3-dioxacyclopentyl) methyl) phosphite, tris (5 (2,5-dimethyl-1,3-dioxacyclohexyl) methyl) phosphite, phenyl-bis (5(2,5-dimethyl-1,3-dioxacyclohexyl)methyl) phosphite, diphenyl-5 (2,5-dimethyl-1,3-dioxacyclohexyl) methyl phosphite, decyl-bis (5 (2,5-dimethyl-1,3-dioxacyclohexyl) methyl) phosphite, tris (5 (2-methyl-2,5-diethyl-1,3-dioxacyclohexyl) methyl) phosphite, m-cresyl-bis (5 (2-methyl-2,5-diethyl-1,3-dioxacyclohexyl) methyl) phosphite, butyl-bis (5 (2-methyl-2,5-diethyl-1,3-dioxacyclohexyl) methyl) phosphite, diamyl-5 (2-methyl-2,5-diethyl-1,3-dioxacyclohexyl) methyl phosphite, tris (5 (2,2-dimethyl-5-propyl-1,3-dioxacyclohexyl) methyl) phosphite, ethyl bis (5 (2,2-dimethyl-5-propyl-1,3-dioxacyclohexyl) methyl) phosphite, tris (5 (2,2-dimethyl-5-heptadecyl-1,3-dioxacyclohexyl) methyl) phosphite, tris (5 (5-methyl-1,3-dioxacyclohexyl) methyl) phosphite, phenyl-bis (5 (5-methyl-1,3-dioxacyclohexyl) methyl) phosphite, diphenyl-5 (5-methyl-1,3-dioxacyclohexyl) methyl phosphite, cetyl-bis (5 (5-methyl-1,3-dioxacyclohexyl) methyl) phosphite, tris (5 (5-ethyl-1,3-dioxacyclohexyl) methyl) phosphite, phenyl-bis (5 (5-ethyl-1,3-dioxacyclohexyl) methyl) phosphite, dodecyl-bis (5 (5-ethyl-1,3-dioxacyclohexyl) methyl) phosphite, bis decyl-5-(5-ethyl-1,3-dioxacyclohexyl) methyl phosphite, tris (5 (2-methyl-5-methyl-1,3-dioxacyclohexyl) methyl) phosphite, phenyl bis(5 (2-methyl-5-methyl-1,3-dioxacyclohexyl) methyl) phosphite, dicyclohexyl-5-(2-methyl-5-methyl-1,3-dioxacyclohexyl) methyl phosphite, tris (5 (2-methyl-5-ethyl-1,3-dioxacyclohexyl) methyl) phosphite, p-ethylphenyl-bis (5 (2-methyl-5-ethyl-1,3-dioxacyclohexyl) methyl) phosphite, tris (5 (2-butyl-5-methyl-1,3-dioxacyclohexyl) methyl) phosphite, tris (5 (2-isobutyl-5-ethyl-1,3-dioxacyclohexyl) methyl) phosphite, tris (5 (2-phenyl-5-ethyl-1,3-dioxacyclohexyl) methyl) phosphite, phenyl-bis (5(2-phenyl-5-ethyl-1,3-dioxacyclohexyl) methyl) phosphite, tris (5 (2-phenyl-5-methyl-1,3-dioxacyclohexyl) methyl) phosphite, tris (5 (2-O-chlorophenyl-5-ethyl-1,3-dioxacyclohexyl) methyl) phosphite, tris (5 (2-m-nitrophenyl-5-methyl-1,3-dioxacyclohexyl) methyl) phosphite, tris (5 (2,2-dimethyl-5-ethyl-1,3-dioxacyclohexyl) methyl) phosphite, phenyl-bis (5 (2,2-dimethyl-5-ethyl-1,3-dioxacyclohexyl) methyl) phosphite, dimethyl-5 (2,2-dimethyl-5-ethyl-1,3-dioxacyclohexyl) methyl phosphite, tris (5 (2,2,5-trimethyl-1,3-dioxacyclohexyl) methyl) phosphite, propyl-bis (5 (2,2,5-trimethyl-1,3-dioxacyclohexyl) methyl) phosphite, tris (5 (2-methyl-2-phenyl-5-ethyl-1,3-dioxacyclohexyl) methyl) phosphite, tris (5 (2,5-dimethyl-2-phenyl-1,3-dioxacyclohexyl) methyl) phosphite, tris (5 (2,2-diethyl-5-methyl-1,3-dioxacyclohexyl) methyl) phosphite, phenyl-bis (5 (2,2-diethyl-5-methyl-1,3-dioxacyclohexyl) methyl) phosphite, tris (3 (3-methyl-1,5-dioxaspiro (6,6) undecyl) methyl) phosphite, amyl-bis (3 (3-methyl-1,5-dioxaspiro (6,6) undecyl (methyl) phosphite, tris (3 (3-ethyl-1,5-dioxaspiro (6,6) undecyl) methyl) phosphite, diphenyl-3-(3-ethyl-1,5-dioxaspiro (6,6) undecyl) methyl phosphite, tris (5 (2-cyclohexyl-5-methyl-1,3-dioxacyclohexyl) methyl phosphite, tris (5 (2,2-diamyl-5-ethyl-1,3-dioxacyclohexyl) methyl) phosphite, tris (5 (2,2-dimethyl-5-phenyl-1,3-dioxacyclohexyl) methyl) phosphite.

As previously indicated the compounds within Formula I can be hydrolyzed to give phosphites containing a plurality of free hydroxyl groups. The hydrolysis is generally carried out under acid conditions in the presence of an alcohol, e.g. ethyl alcohol, butyl alcohol or the like. The acetal or ketal ring is broken during the hydrolysis and one of the esterifying groups of the phosphite is also removed to produce a secondary phosphite with the plurality of reactive hydroxyl groups. If an aryl group, e.g. phenyl is present in the phosphite ester or if an alkyl or alkenyl group is present this is removed in the hydrolysis step in the preference to the polyhydric alcohol residue on the phosphite ester. The phenol or alcohol formed can be removed by distillation as can the solvent employed in the hydrolysis. Usually 1% of acid is sufficient to carry out the hydrolysis although this can be varied. A small amount of water also is normally present in the hydrolysis step.

To make the starting acetals or ketals of Formula VII there are reacted pentaerythritol and any of the aldehydes or ketones which are set forth supra as being suitable for making the acetals or ketals of Formula VI.

Examples of starting acetals or ketals within Formula VII include 2-methyl-2-ethyl-5,5-bis hydroxymethyl-1,3-dioxacyclohexane,
5,5-bis hydroxymethyl-1,3-dioxacyclohexane,
2-methyl-5,5-bis hydroxymethyl-1,3-dioxacyclohexane,
2-ethyl-5,5-bis hydroxymethyl-1,3-dioxacyclohexane,
2-propyl-5,5-bis hydroxymethyl-1,3-dioxacyclohexane,
2-isopropyl-5,5-bis hydroxymethyl-1,3-dioxacyclohexane,
2-butyl-5,5-bis hydroxymethyl-1,3-dioxacyclohexane,
2-undecyl-5,5-bis hydroxymethyl-1,3-dioxacyclohexane,
2-heptadecyl-5,5-bis hydroxymethyl-1,3-dioxacyclohexane,
2-isobutyl-5,5-bis hydroxymethyl-1,3-dioxacyclohexane,
2-hexyl-5,5-bis hydroxymethyl-1,3-dioxacyclohexane,
2-phenyl-5,5-bis hydroxymethyl-1,3-dioxacyclohexane,
2-vinyl-5,5-bis hydroxymethyl-1,3-dioxacyclohexane,
2-propenyl-5,5-bis hydroxymethyl-1,3-dioxacyclohexane,
2-heptadecenyl-5,5-bis hydroxymethyl-1,3-dioxacyclohexane (from oleic aldehyde and pentaerythritol),
2-o-methylphenyl-5,5-bis hydroxymethyl-1,3-dioxacyclohexane,
2-p-methylphenyl-5,5-bis hydroxymethyl-1,3-dioxacyclohexane,
2-α-naphthyl-5,5-bis hydroxymethyl-1,3-dioxacyclohexane,
2-β-naphthyl-5,5-bis hydroxymethyl-1,3-dioxacyclohexane,
2-p-chlorophenyl-5,5-bis hydroxymethyl-1,3-dioxacyclohexane,
2-o-chlorophenyl-5,5-bis hydroxymethyl-1,3-dioxacyclohexane,
2-o-nitrophenyl-5,5-bis hydroxymethyl-1,3-dioxacyclohexane,
2-m-nitrophenyl-5,5-bis hydroxymethyl-1,3-dioxacyclohexane,
2(2',4'dichlorophenyl)-5,5-bis hydroxymethyl-1,3-dioxacyclohexane,
2-p-bromophenyl-5,5-bis hydroxymethyl-1,3-dioxacyclohexane,
2-cyclohexyl-5,5-bis hydroxymethyl-1,3-dioxacyclohexane,
2,2-dimethyl-5,5-bis hydroxymethyl-1,3-dioxacyclohexane,
2-methyl-2-propyl-5,5-bis hydroxymethyl-1,3-dioxacyclohexane,
2,2-diethyl-5,5-bis hydroxymethyl-1,3-dioxacyclohexane,
2-methyl-2-butyl-5,5-bis hydroxymethyl-1,3-dioxacyclohexane,
2-ethyl-2-propyl-5,5-bis hydroxymethyl-1,3-dioxacyclohexane,
2-methyl-2-t. butyl-5,5-bis hydroxymethyl-1,3-dioxacyclohexane,
2,2-dipropyl-5,5-bis hydroxymethyl-1,3-dioxacyclohexane,
2,2 diamyl-5,5-bis hydroxymethyl-1,3-dioxacyclohexane,
2,2-diheptadecyl-5,5-bis hydroxymethyl-1,3-dioxacyclohexane,
3,3-bis hydroxymethyl-1,5-dioxaspiro (6,6) undecane,
3,3-bis hydroxymethyl-1,5-dioxaspiro (6,6) decane,
2,2-diphenyl-5,5-bis hydroxymethyl-1,3-dioxacyclohexane,
2-methyl-2-phenyl-5,5-bis hydroxymethyl-1,3-dioxacyclohexane,
2-ethyl-2-phenyl-5,5 bis hydroxymethyl-1,3-dioxacyclohexane.

The compounds within Formula VII are prepared by reacting 1 mol of pentaerythritol with 1 mol of an aldehyde or ketone under anhydrous conditions using a small amount, e.g. 0.1–5% based on the pentaerythritol of an acid such as hydrochloric or p-toluene sulfonic acid as a catalyst. The procedure employed can be similar to that of the Gilbert and Hopff patents, but utilizing pentaerythritol as the starting polyhydric alcohol.

Illustrative examples of compounds within Formula II wherein the following numbering system is employed

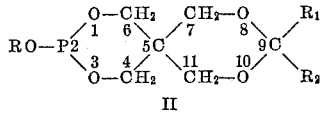

II include 2-(phenoxy)-9-methyl-9-ethyl-1,3,8,10-tetraoxa-2-phospha-spiro (5,5) undecane,
2-(p-cresoxy)-9-methyl-9-ethyl-1,3,8,10-tetraoxa-2-phospha-spiro (5,5) undecane,
2-(methoxy)-9-methyl-9-ethyl-1,3,8,10-tetraoxa-2-phospha-spiro (5,5) undecane,
2-(decoxy)-9-methyl-9-ethyl-1,3,8,10-tetraoxa-2-phospha-spiro (5,5) undecane,
2-(octadecoxy)-9-methyl-9-ethyl-1,3,8,10-tetraoxa-2-phospha-spiro (5,5) undecane,
2-(oleyloxy)-9-methyl-9-ethyl-1,3,8,10-tetraoxa-2-phospha-spiro (5,5) undecane,
2-(p-butylphenoxy)-9-methyl-9-ethyl-1,3,8,10-tetraoxa-2-phospha-spiro (5,5) undecane,
2-(α-naphthoxy)-9-methyl-9-ethyl-1,3,8,10-tetraoxa-2-phospha-spiro (5,5) undecane,
2-(β-napthoxy)-9-methyl-9-ethyl-1,3,8,10-tetraoxa-2-phospha-spiro(5,5) undecane,
2-(cyclohexoxy)-9-methyl-9-ethyl-1,3,8,10-tetraoxa-2-phospha-spiro (5,5) undecane,
2-(o-chlorophenoxy)-9-methyl-9-ethyl-1,3,8,10-tetraoxa-2-phospha-spiro (5,5) undecane,
2-(p-bromophenoxy)-9-methyl-9-ethyl 1,3,8,10-tetraoxa-2-phospha-spiro (5,5) undecane,
2-(m-cresoxy)-9-methyl-9-ethyl-1,3,8,10-tetraoxa-2-phospha-spiro (5,5) undecane,
2-(butoxy)-9,9-dimethyl-1,3,8,10-tetraoxa-2-phospha-spiro (5,5) undecane,
2-(phenoxy)-9-dimethyl-1,3,8,10-tetraoxa-2-phospha-spiro (5,5) undecane,
2-(o-cresoxy)-9,9-dimethyl-1,3,8,10-tetraoxa-2-phospha-spiro (5,5) undecane,
2-(phenyl)-1,3,8,10-tetraoxa-2-phospha-spiro (5,5) undecane,
2-(octadecoxy)-1,3,8,10-tetraoxa-2-phospha-spiro (5,5) undecane,
2-(phenoxy)-9-methyl-1,3,8,10-tetraoxa-2-phospha-spiro (5,5) undecane,
2-(ethoxy)-9-methyl-1,3,8,10-tetraoxa-2-phospha-spiro (5,5) undecane,
2-(phenoxy)-9-ethyl-1,3,8,10-tetraoxa-2-phospha-spiro-(5,5)-undecane,
2-(oleyloxy)-9-ethyl-1,3,8,10-tetraoxa-2-phospha-spiro (5,5) undecane,
2-(phenoxy)-9-propyl-1,3,8,10-tetraoxa-2-phospha-spiro (5,5) undecane,
2-(decoxy)-9-propyl-1,3,8,10-tetraoxa-2-phospha-spiro (5,5) undecane,
2-(phenoxy)-9-isopropyl-1,3,8,10-tetraoxa-2-phospha-spiro (5,5) undecane,
2-(phenoxy)-9-heptadecyl-1,3,8,10-tetraoxa-2-phospha-spiro-(5,5) undecane,
2-(methoxy)-9-heptadecyl-1,3,8,10-tetraoxa-2-phospha-spiro-(5,5) undecane,
2-(phenoxy)-9-heptadecenyl-1,3,8,10-tetraoxa-2-phospha-spiro (5,5) undecane,
2-(p-cresoxy)-9-vinyl-1,3,8,10-tetraoxa-2-phospha-spiro (5,5) undecane,
2-(phenoxy)-9-vinyl-1,3,8,10-tetraoxa-2-phospha-spiro (5,5) undecane,
2-(dodecoxy)-9-vinyl-1,3,8,10-tetraoxa-2-phospha-spiro-(5,5) undecane, 2-(phenoxy)-9-phenyl-1,3,8,10-tetraoxa-2-phospha-spiro (5,5) undecane,
2-(octoxy)-9-phenyl-1,3,8,10-tetraoxa-2-phospha-spiro (5,5) undecane,
2-(m-cresoxy)-9-p-methylphenyl-1,3,8,10-tetraoxa-2-phospha-spiro (5,5) undecane,
2-(octadecoxy)-9-o-chlorophenyl-1,3,8,10-tetraoxa-2-phospha-spiro (5,5) undecane,
2-(phenoxy)-9-m-nitrophenyl-1,3,8,10-tetraoxa-2-phospha-spiro (5,5) undecane,
2-(ethoxy)-9-m-nitrophenyl-1,3,8,10-tetraoxa-2-phospha-spiro (5,5) undecane,
2-(phenoxy)-9-α-naphthyl-1,3,8,10-tetraoxa-2-phospha-spiro (5,5) undecane,
2-(phenoxy)-9-methyl-9-propyl-1,3,8,10-tetraoxa-2-phospha-spiro (5,5) undecane,
2-(decoxy)-9-methyl-9-propyl-1,3,8,10-tetraoxa-2-phospha-spiro (5,5) undecane,
2-(p-cresoxy)-9-methyl-9-propyl-1,3,8,10-tetraoxa-2-phospha-spiro (5,5) undecane,
2-(phenoxy)-9,9-diethyl-1,3,8,10-tetraoxa-2-phospha-spiro (5,5) undecane,
2-(pentoxy)-9,9-diethyl-1,3,8,10-tetraoxa-2-phospha-spiro (5,5) undecane,
2-(phenoxy)-9-methyl-9-butyl-1,3,8,10-tetraoxa-2-phospha-spiro (5,5) undecane,
2-(methoxy)-9-ethyl-9-propyl-1,3,8,10-tetraoxa-2-phospha-spiro (5,5) undecane,
2-(ethoxy)-9-methyl-9-t. butyl-1,3,8,10-tetraoxa-2-phospha-spiro (5,5) undecane,
2-(phenoxy)-9,9-dipropyl-1,3,8,10-tetraoxa-2-phospha-spiro (5,5) undecane,
2-(phenoxy)-9,9-diamyl-1,3,8,10-tetraoxa-2-phospha-spiro (5,5) undecane,
2-(phenoxy)-9,9-diheptadecyl-1,3,8,10-tetraoxa-2-phospha-spiro (5,5) undecane,
2-(phenoxy)-1,3,8,10-tetraoxa-2-phospha-dispiro (5,5,9,9) hexadecane

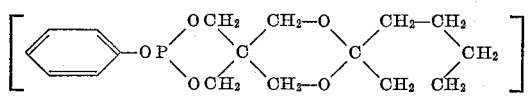

2-(butoxy)-1,3,8,10-tetraoxa-2-phospha-dispiro (5,5,9,9) hexadecane,
2-(phenoxy)-1,3,8,10-tetraoxa-2-phospha-dispiro (5,5,9,9) pentadecane,
2-(phenoxy)-9,9-diphenyl-1,3,8,10-tetraoxa-2-phospha-spiro (5,5) undecane,
2-(o-cresoxy)-9,9-diphenyl-1,3,8,10-tetraoxa-2-phospha-spiro (5,5) undecane,
2-(octoxy) 9,9-diphenyl-1,3,8,10-tetraoxa-2-phospha-spiro-(5,5) undecane,
2-(methoxy)-9-methyl-9-phenyl-1,3,8,10-tetraoxa-2-phospha-spiro (5,5) undecane,
2-(phenoxy)-9-methyl-9-phenyl-1,3,8,10-tetraoxa-2-phospha-spiro (5,5) undecane,
2-(propoxy)-9,9-dimethyl-1,3,8,10-tetraoxa-2-phospha-spiro (5,5) undecane,
2-(phenoxy)-9-butyl-1,3,8,10-tetraoxa-2-phospha-spiro (5,5) undecane,
2-(ethoxy)-9-isobutyl-1,3,8,10-tetraoxa-2-phospha-spiro (5,5) undecane,
2-(phenoxy)-9-cyclohexyl-1,3,8,10-tetraoxa-2-phospha-spiro (5,5) undecane.

The starting acetals and ketals of Formula VIII (and IX) are prepared by reacting 2 mols of a glycol having at least 4 carbon atoms between the hydroxyl groups (or a polyalkylene glycol) with 1 mol of any of the aldehydes or ketones previously set forth as being suitable for forming the compounds of Formula VI, as the glycol there can be used tetramethylene glycol (butanediol-1,4), pentanediol - 1,5, hexanediol - 1,6, decanediol - 1,10, eicosanediol-1,20, 2-methyl-butanediol-1,4, As the polyalkylene glycol (for making compounds of Formula IX) there can be used diethylene glycol, triethylene glycol, polyethylene glycol, polyethylene glycol molecular weight 2000, dipropylene glycol, tripropylene glycol, polypropylene glycol molecular weight 4000, polyethylene glycol molecular weight 4000, dibutylene glycol, polybutylene glycol molecular weight 2000, glycol molecular weight 1500 prepared from a mixture of ethylene oxide and propylene oxide (60 mol percent ethylene oxide). The reaction is carried out under anhydrous conditions in the presence of a small amount, e.g. 0.1–5%, of an acid, e.g. hydrochloric acid or p-toluenesulfonic acid, based on the amount of alcohol reactant. There can be used the reaction condition of the aforementioned Gilbert and Hopff patents but using 2 mols of the alcohol per mole of the aldehyde or ketone.

Examples of acetals and ketals within Formula VIII include 2,2-di (4'-hydroxybutoxy)butane, 2,2-di (5'-hydroxypentoxy) butane, 2,2-di (10'-hydroxydecoxy) butane, 2,2-di (20'-hydroxyeicosanoxy) butane, 2,2-di (6'-hydroxyhexoxy) butane, di-(4-hydroxybutoxy) methane, di-(5-hydroxypentoxy) methane, di(10-hydroxydecoxy) methane, 1,1-di (4'-hydroxybutoxy) ethane, 1,1-di (10'-hydroxydecoxy) ethane, 1,1-di (4'-hydroxybutoxy) propane, 1,1-di (10'-hydroxydecoxy) propane, 1,1-di (4'-hydroxybutoxy) butane, 1,1-di (4'-hydroxybutoxy)-2-methyl propane, 1,1-di (4'-hydroxybutoxy) dodecane, 1,1-di (10'-hydroxydecoxy) dodecane, 1,1-di (4'-hydroxybutoxy) octadecane, 1,1-di (10'-hydroxydecoxy) octadecane, di (4'-hydroxybutoxy) phenyl methane

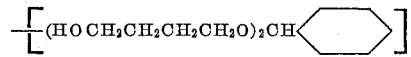

1,1-di (4-hydroxybutoxy) propene-2, 1,1-di (10'-hydroxydecoxy) propene-2-, 1,1-di (4'-hydroxybutoxy) butene-2, 1,1-di (4'-hydroxybutoxy) octadecene-9, di (4'-hydroxybutoxy) cyclohexyl methane, di (5'-hydroxypentoxy) p-methylphenyl methane, di (4'-hydroxybutoxy) β-naphthyl methane, di (4'-hydroxybutoxy) o-chlorophenyl methane, di (4'-hydroxybutoxy) m-nitrophenyl methane, 2,2-di (4'-hydroxybutoxy) propane, 2,2-di (5'-hydroxypentoxy) propane, 2,2-di(10'-hydroxydecoxy) propane, 2,2-di (4'-hydroxybutoxy) pentane, 2,2-di (10'-hydroxydecoxy) pentane, 3,3-di (4'-hydroxybutoxy) pentane, 3,3-di (10'-hydroxydecoxy) pentane, 2,2-di (4'-hydroxybutoxy) hexane, 3,3-di (10'-hydroxydecoxy) hexane, 2,2-di (4'-hydroxybutoxy)-3,3-dimethyl butane, 3,3 di (5'-hydroxypentoxy)-hexane, 4,4-di (6'-hydroxyhexoxy) heptane, 6,6-di (4'-hydroxybutoxy) undecane, 18,18-di (4'-hydroxybutoxy) pentatriacontane, 1,1-di (4'-hydroxybutoxy) cyclohexane, 1,1-di (4'-hydroxybutoxy) cyclopentane, di (4'-hydroxybutoxy) di phenyl methane

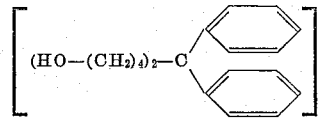

1,1-di (8'-hydroxyoctoxy)-1-phenyl ethane, 1,1-di (4'-hydroxybutoxy)-1-phenyl propane, di (hydroxyethoxyethoxy) methane, 1,1-di (hydroxyethoxyethoxy) ethane, 1,1-di-(hydroxyethoxyethoxy) butane, 2,2-di (hydroxyethoxyethoxy) propane, 2,2-di-(hydroxyethoxyethoxy) butane, 1,1-di (2'-hydroxypropoxypropoxy) ethane, 2,2-di (2'-hydroxypropoxypropoxy) propane, 2,2-di (2'-hydroxypropoxypropoxy) butane, 2,2-di (hydroxypolyethoxy) propane (where the polyethoxy group has a molecular weight of 2000) 2,2-di (2-hydroxypolypropoxy) butane (where the polypropoxy group has a molecular weight of 1000), 1,1-di (2-hydroxybutoxybutoxy) cyclohexane, di (hydroxyethoxyethoxyethoxy) phenyl methane.

Illustrative of compounds within Formulae III and IV are 2,2-bis (diphenoxyphosphaoxybutoxy) propane

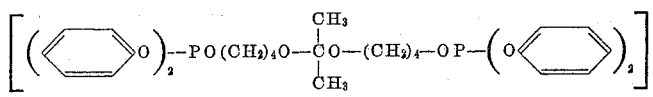

2,2-bis (di-p-cresoxyphosphaoxybutoxy) propane,
2,2-bis (dimethoxyphosphaoxybutoxy) propane,
2,2-bis (didecoxyphosphaoxybutoxy) propane,
2,2-bis (phenoxydecoxyphosphaoxybutoxy) propane

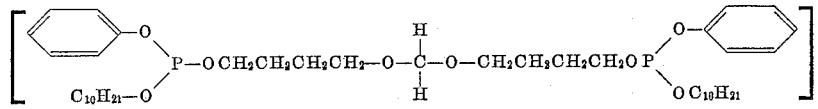

2,2-bis (di-octadecoxyphosphaoxybutoxy) propane,
2,2-bis (di-oleyloxyphosphaoxybutoxy), propane,
2,2-bis (di-p-butylphenoxyphosphaoxybutoxy) propane,
2,2-bis (di-α-naphthoxyphosphaoxybutoxy) propane,
2,2-bis (di-β-naphthoxyphosphaoxybutoxy) propane,
2,2-bis (di-cyclohexoxyphosphaoxybutoxy) propane,
2,2-bis (di-o-chlorophenoxyphosphaoxybutoxy) propane,
2,2-bis (di-p-bromophenoxyphosphaoxybutoxy) propane,
2,2-bis (di-m-cresoxyphenoxyphosphaoxybutoxy) propane,
2,2-bis (di-butoxyphosphaoxybutoxy) butane,
2,2-bis (di-phenoxyphosphaoxybutoxy) butane,
2,2-bis (di-o-cresoxy-phosphaoxybutoxy) butane,
2,2-bis (di-ethoxyphosphaoxypentoxy) butane,
2,2-bis (diphenoxyphosphaoxypentoxy) butane,
2,2-bis (diphenoxyphosphaoxydecoxy) butane,
2,2-bis (dioctoxyphosphaoxyeicosanoxy) butane,
2,2-bis (diphenoxyphosphaoxyhexoxy) butane,
bis (diphenoxyphosphaoxybutoxy) methane,
bis (di-octadecoxyphosphaoxybutoxy) methane,
bis (di-m-cresoxyphosphaoxypentoxy) methane,
bis (dimethoxyphosphaoxydecoxy) methane,
1,1-bis (diethoxyphosphaoxybutoxy) ethane,
1,1-bis (diphenoxyphosphaoxydecoxy) ethane,
1,1-bis (diphenoxyphosphaoxybutoxy) propane,
1,1-bis (dipentoxyphosphaoxydecoxy) propane,
1,1-bis (dioleyloxyphosphaoxypentoxy) propane,
1,1-bis (diphenoxyphosphaoxybutoxy) butane,
1,1-bis (didecoxyphosphaoxybutoxy) butane,
1,1-bis (diphenoxyphosphaoxybutoxy)-2-methylpropane,
1,1-bis (diphenoxyphosphaoxybutoxy) dodecane,
1,1-bis (isopropoxyphosphaoxydecoxy) dodecane,
1,1-bis (diphenoxyphosphaoxybutoxy) octadecane,
1,1-bis (dimethoxyphosphaoxybutoxy) octadecane,
1,1-bis (diphenoxyphosphaoxydecoxy) octadecane,
bis (di-o-cresoxyphosphaoxybutoxy) (phenyl) methane,
1,1-bis (diphenoxyphosphaoxybutoxy) propene-2,
1,1-bis (didodecoxyphosphaoxybutoxy) propene-2,
1,1-bis (diphenoxyphosphaoxydecoxy) propene-2,
1,1-bis (dipropoxyphosphaoxybutoxy) butene-2,
1,1-bis (diphenoxyphosphaoxybutoxy) octadecene-9,
1,1-bis (diphenoxyphosphaoxybutoxy) (cyclohexyl) methane,
bis (dioctoxyphosphaoxybutoxy) (phenyl) methane,
bis (di-m-cresoxyphosphaoxypentoxy) (p-methylphenyl) methane,
bis (diphenoxyphosphaoxybutoxy) (β-naphthyl) methane,
bis (dioctadecoxyphosphaoxybutoxy) (o-chlorophenoxy) methane,
bis (diphenoxyphosphaoxybutoxy) (m-nitrophenoxy) methane,
2,2-bis (didecoxyphosphaoxybutoxy) pentane,
2,2-bis (diphenoxyphosphaoxypentoxy) pentane,
3,3-bis (diphenoxyphosphaoxybutoxy) pentane,
3,3-bis (dipentoxyphosphaoxydecoxy) pentane,
2,2-bis (diphenoxyphosphaoxypentoxy) hexane,
3,3-bis (diethoxyphosphaoxybutoxy) hexane,
2,2-bis (dimethoxyphosphaoxybutoxy) 3-3-dimethylbutane,
4,4-bis (diphenoxyphosphaoxyhexoxy) heptane,
6,6-bis (diphenoxyphosphaoxybutoxy) undecane,
18,18-bis (diphenoxyphosphaoxybutoxy) pentatriacontane,
1,1-bis (diphenoxyphosphaoxybutoxy) cyclohexane,
1,1-bis (dibutoxyphosphaoxybutoxy) cyclohexane,
1,1-bis (diphenoxyphosphaoxybutoxy) cyclopentane,
bis (di-o-cresoxyphosphaoxybutoxy) (diphenyl) methane,
bis (dioctoxyphosphaoxybutoxy) (diphenyl) methane,
1,1-dis (dimethoxyphosphaoxyoctoxy)-1-phenylethane,
1,1-bis (diphenoxyphosphaoxybutoxy)-1-phenylethane,
1,1-bis (diphenoxyphosphaoxybutoxy)-1-phenylpropane,
bis (diphenoxyphosphaoxyethoxyethoxy) methane,
1,1-bis (dipropoxyphosphaoxyethoxyethoxy) ethane,
1,1-bis (didecoxyphosphaoxyethoxyethoxy) butane,
2,2-bis (diphenoxyphosphaoxyethoxyethoxy) propane,
2,2-bis (dimethoxyphosphaoxyethoxyethoxy) butane,
1,1-bis (diphenoxyphospha-2'-oxypropoxypropoxy) ethane,
2,2-bis (diphenoxyphospha-2'-oxypropoxypropoxy) propane,
2,2-bis (dipentoxyphospha-2'-oxypropoxypropoxy) butane,
2,2-bis (diphenoxyphosphaoxypolyethoxy) propane (where the polyethoxy group has a molecular weight of 2000),
2,2-bis(dioctoxyphosphaoxypolypropoxy) butane (where the polypropoxy group has a molecular weight of 1000),
1,1 - bis (diphenoxyphosphaoxybutoxybutoxy) cyclohexane, bis ( diphenoxyphosphaoxyethoxyethoxyethoxy) (phenyl) methane.

The starting acetals and ketals of Formula X are prepared by reacting 1 mol of a hexitol such as a sorbitol or mannitol with 2 mols of any of the aldehydes or ketones previously set forth as being suitable for forming the compounds of Formula VI. The reaction is carried out under anhydrous conditions in the manner previously set forth, e.g., utilizing 0.1–5% of an acid such as hydrochloric acid or p-toluene sulfonic acid based on the amount of hexitol. The reaction conditions of the above mentioned Gilbert and Hopff patents but using 2 mols of aldehyde or ketone per mol of sorbitol or mannitol can be employed. They can also be prepared as set forth in Micheel, "Chemi der Zucker und Polysaccharide" (1935), pages 113, 115, 118, and the references cited therein.

Examples of acetals and ketals within Formula X include 1,3,2,4-diethylidene sorbitol, 1,3,2,4-dibenzylidene sorbitol, 1,2,5,6-diisopropylidene mannitol, 1,3,2,4-diisopropylidene sorbitol, 1,3,2,4-dicyclohexylidene sorbitol, 1,3,2,4-dimethylene sorbitol, 1,3,2,4-di isobutylidene sorbitol, 1,2,5,6-di-benzylidene mannitol, 1,2,5,6-di ethylidene mannitol, 1,3,2,4-di n-butylidene sorbitol.

Illustrative of compounds within Formula V are 5,6-monophenyl phosphite ester of 1,3,2,4-diisopropylidene sorbitol

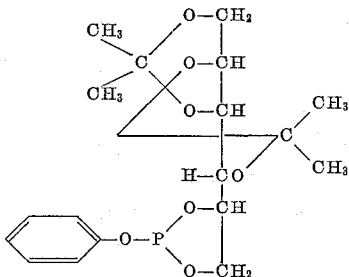

5,6-mono p-tolyl phosphite ester of 1,3,2,4-diisopropylidene sorbitol, 5,6-mono methyl phosphite ester of 1,3,2,4-diisopropylidene sorbitol, 5,6-mono decyl phosphite ester of 1,3,2,4-diisopropylidene sorbitol, 5,6-mono octadecyl phosphite ester of 1,3,2,4-diisopropylidene sorbitol, 5,6-mono oleyl phosphite ester of 1,3,2,4-diisopropylidene sorbitol, 5,6-mono p-amylphenyl phosphite ester of 1,3,2,4-diisopropylidene sorbitol, 5,6-mono β-naphthyl phosphite ester of 1,3,2,4-diisopropylidene sorbitol, 5,6-mono cyclohexyl phosphite ester of 1,3,2,4-diisopropylidene sorbitol, 5,6-mono o-chlorophenyl phosphite ester of 1,3,2,4-diisopropylidene sorbitol, 5,6-mono-p-bromophenyl phosphite ester of 1,3,2,4-diisopropylidene sorbitol, 5,6-mono phenyl phosphite ester of 1,3,2,4-diethylidene sorbitol, 5,6-mono butyl phosphite ester of 1,3,2,4-diethylidene sorbitol, 5,6-mono phenyl phosphite ester of 1,3,2,4-dibenzylidene sorbitol, 5,6-mono ethyl phosphite ester of 1,3,2,4-dibenzylidene sorbitol, 3,4-mono m-tolyl phosphite ester of 1,2,5,6-diisopropylidene mannitol, 3,4-mono hexadecyl phosphite ester of 1,2,5,6-diisopropylidene mannitol, 5,6-mono phenyl phosphite ester of 1,3,2,4-dicyclohexylidene sorbitol, 5,6-mono octadecyl phosphite ester of 1,3,2,4-di-cyclohexylidene sorbitol, 5,6-mono phenyl phosphite ester of 1,3,2,4-dimethylene sorbitol, 5,6-mono phenyl phosphite ester of 1,3,2,4-diisobutylidene sorbitol, 5,6-mono methyl phosphite ester of 1,3,2,4-di isobutylidene sorbitol, 3,4-mono phenyl phosphite ester of 1,2,5,6-di benzylidene mannitol, 3,4-mono decyl phosphite ester of 1,2,5,6-di ethylidene mannitol, 5,6-mono phenyl phosphite ester of 1,3,2,4-di n-butylidene sorbitol.

Unless otherwise indicated, all parts and percentages are by weight.

*Example 1*

4.0 mols of glycerine, 8.0 mols of methyl ethyl ketone, 400 grams of hexane and 10 grams of p-toluene sulfonic acid were mixed and heated at reflux for 16 hours, during which time the refluxing vapors were conducted through an efficient fractionating column and condensed into a water trap. After cooling to 20° C. the reaction mixture was treated with 10 grams of sodium carbonate and filtered. The product was 2-methyl-2-ethyl-5-methylol-1,3-dioxacyclopentane and was isolated by distillation, yield 485 grams (82.8% of theory), B.P. 63–67° C./0.3 mm., hydroxyl value 382.7 (383 is theoretical), appearance—colorless liquid.

*Example 2*

The procedure of Example 1 was repeated using 8.0 mols of acetone, 2.0 mols of trimethylolethane, 400 grams of pentane and 6.0 grams of p-toluene sulfonic acid. The product was 2,2,5-trimethyl-5-methylol-1,3-dioxacyclohexane, yield 283 grams (88.2% of theory), B.P. 84–88° C./0.8 mm., appearance—viscous colorless liquid. Infrared analysis showed a strong OH absorption at 2.78 microns and a strong cyclic ether absorption at 9.22 microns.

*Example 3*

0.5 mol of triphenyl phosphite was mixed with 1.0 mole of 2-methyl-2-ethyl-5-methylol-1,3-dioxacyclopentane and 0.3 gram of sodium methylate and heated at 90° to 110° C. at 10 mm. over a one hour period while phenol was distilled from the reaction mixture. The pressure was then reduced to 0.3 mm. and the temperature was increased to 170° C. to remove the last trace of phenol. The product was cooled and filtered to remove the catalyst to obtain phenyl-bis (5-(2-methyl-2-ethyl-1,3-dioxacyclopentyl)methyl) phosphite as a colorless liquid in a yield of 200.1 grams (96.6% of theory). Infrared spectrum analysis supported the structure.

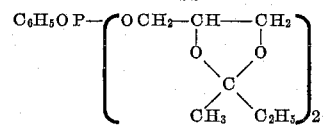

*Example 4*

The procedure of Example 3 was employed using 0.5 mol of triphenyl phosphite, 1.8 mols of 2,2,5-trimethylethyl-5-methylol-1,3-dioxacyclopentane and 0.4 gram of sodium methylate as the catalyst. The product obtained in a yield of 223 grams (95.5% of theory) was tris(5-(2 - methyl - 2-ethyl-1,3-dioxacyclopentyl)methyl) phosphite, a colorless liquid. Infrared analysis supported the structure

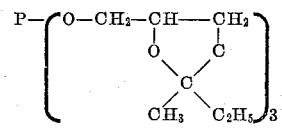

*Example 5*

The procedure of Example 3 was employed using 0.5 mols of triphenyl phosphite, 1.8 mols of 2,2,5-trimethyl-5-methylol-1,3-dioxacyclohexane and 0.5 gram of sodium methylate. The product obtained in a yield of 251 grams (91.3% of theory) was tris(5-(2,2,5-trimethyl-1,3-dioxacyclohexyl)methyl) phosphite, a viscous, colorless liquid. Infrared analysis supported the structure

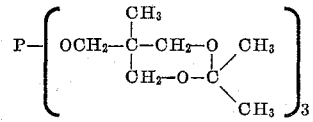

*Example 6*

The procedure of Example 3 was employed using 0.5 mol of dibutylphenyl phosphite, 0.55 mol of 2,2,5-trimethyl-5-methylol-1,3-dioxacyclohexane and 0.2 gram of sodium methylate. The product obtained in a yield of 123 grams (73.1% of theory) was dibutyl-5-(2,2,5-trimethyl-1,3-dioxacyclohexyl)methyl phosphite, a colorless liquid, B.P. 125–135° C./0.2 mm. having the formula:

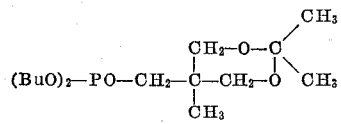

*Example 7*

The procedure of Example 3 was repeated using 0.5 mol of triphenyl phosphite, 0.55 mol of 2,2,5-trimethyl-5-methylol-1,3-dioxacyclohexane and 0.3 gram of sodium methylate. The product obtained in a yield of 199.2 grams (96.8% of theory) was diphenyl-5-(2,2,5-trimethyl-1,3-dioxacyclohexyl) methyl phosphite, a colorless viscous liquid. Infrared analysis supported the structure

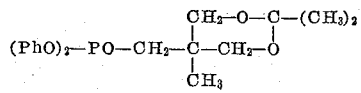

Example 8

41.4 grams (0.1 mol) of phenyl bis-[5-(2-methyl-2-ethyl-1,3-dioxacyclopentyl) methyl] phosphite (the product of Example 3) was treated with 30 grams of methyl ethyl ketone containing 0.1 mol of water and 2 drops of concentrated HCl, using a cooling bath to hold the temperature at 20° C. After completing the addition and stirring for 15 minutes, one gram of sodium bicarbonate was added and the methyl ethyl ketone removed by distillation. Vacuum was applied and the phenol which had formed was removed by distillation. 10.1 grams were collected (9.4 grams is theory). There remained in the distilling flask 38 grams of bis-[5-(2-methyl-2-ethyl-1,3-dioxacyclopentyl) methyl] phosphite, a colorless liquid product which when analyzed by infrared showed strong absorptions corresponding to P=O and P—H but no absorption for mono-substituted phenyl.

Example 9

The ketal group of the secondary phosphite of Example 8 was hydrolyzed by treating 0.151 mol of the phosphite with 0.5 mol of water and 0.5 gram of concentrated HCl in 40 grams of methanol. The product isolated in the manner described in Example 8 was bis-(2,3-dihydroxypropyl) phosphite having the formula $$\text{HOP—(OCH}_2\text{CHCH}_2\text{OH)}_2$$
$$\qquad\qquad\;\;|$$
$$\qquad\qquad\;\text{OH}$$

It was a viscous, colorless liquid obtained in a yield of 31 grams (89.4% theory) and showed a strong OH absorption when analyzed by infrared spectroscopy.

Example 10

The combined procedure of Examples 8 and 9 was repeated using the product of Example 5 as the starting material rather than the product of Example 3. After hydrolysis and the distillation, the residue was bis-(2-methyl-2-hydroxymethyl-3-hydroxypropyl) phosphite having the formula:

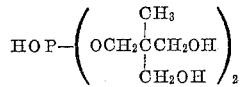

Example 11

The combined procedure of Examples 8 and 9 was repeated using the product of Example 6 as the starting material. After hydrolysis and distillation, the residue was butyl 2-methyl-2-hydroxymethyl-3-hydroxypropyl phosphite.

Example 12

0.5 mol of tridecyl phosphite was mixed with 1.0 mol of 2-methyl-4-methylol-1,3-dioxacyclopentane and 0.3 gram of sodium decylate and heated at 10 mm. while distilling off the decyl alcohol formed. The product was cooled and filtered to obtain decyl bis-[4-(2-methyl-1,3-dioxacyclopentyl) methyl] phosphite as the residue.

Example 13

0.5 mol of triphenyl phosphite was mixed with 1.6 mols of 3-hydroxymethyl-1,4-dioxaspiro (5,5) decane and 0.3 gram of sodium methylate and heated at 10 mm. while distilling off the phenol formed. The product obtained was tris-[(1,4-dioxaspiro (5,5) decyl) methyl] phosphite.

In like manner there can be made any of the other compounds set forth above as being within Formula I.

Example 14

Phenyl diethylidene sorbitol phosphite was prepared by heating 0.1 mol (18.2 grams) of 1,3,2,4-diethylidene sorbitol [prepared by the method of Hockett et al., J.A.C.S., vol. 69, pages 849–851 (1947)], 0.1 mol (31.0 grams) of triphenyl phosphite and 0.1 gram of sodium methylate to 150° C. A slight vacuum was applied and phenol was removed by distillation while the temperature was slowly raised to 180° C. After removing nearly the theoretical amount of phenol (0.2 mol), the vacuum was reduced to 1.0 mm. Hg to remove the final traces of phenol. The 5,6-monophenyl phosphite ester of 1,3,2,4-diisopropylidene sorbitol product was a white solid obtained in a 94.3% yield.

Example 15

1.0 mol (118.2 grams) of 1,6-hexanediol, 0.5 mol (36.0 grams) of methyl ethyl ketone, 150 grams of hexane and 2 grams of p-toluene sulfonic acid were heated and refluxed through a fractionating column fitted with a water trap to remove the water of reaction. After 20 hours of refluxing, the theoretical amount of water (9 grams) was collected. The reaction mixture was neutralized with dry sodium carbonate and filtered. The solvent was removed in vacuo leaving 141 grams of 2,2-di-(6'-hydroxyhexoxy) butane, an amber solid having a hydroxyl number of 379 (theory is 386).

To 0.1 mol (29.0 grams) of the 2,2-di-(6'-hydroxyhexoxy) butane there were added 0.2 mol (62.0 grams) of triphenyl phosphite and 0.1 gram of sodium methylate, and the mixture was heated to 150° C. A slight vacuum was applied and phenol was removed by distillation while the temperature was slowly raised to 180° C. After removing 18 grams of phenol, the vacuum was reduced to 1.0 mm. Hg and an additional 1.5 grams of phenol distilled. The total amount of phenol (19.5 grams) removed corresponded closely to theory (18.82 grams). The product was cooled to 70° C. and filtered. The 2,2-bis-(diphenoxyphosphaoxyhexoxy) butane product was obtained as a viscous, amber liquid in an amount of 68.9 grams (95.5%).

Example 16

One mol of pentaerythritol and one mol of methyl ethyl ketone, 150 grams of hexane and 2 grams of p-toluene sulfonic acid were heated and refluxed in the manner described in Example 15 to remove the theoretical amount of water (18 grams). The product was neutralized with dry sodium carbonate and filtered. The solvent was removed in vacuo to obtain 2-methyl-2-ethyl-5,5-bis-hydroxymethyl-1,3-dioxacyclohexane.

To 0.1 mol of the 2-methyl-2-ethyl-5,5-bis-hydroxymethyl-1,3-dioxacyclohexane there were added 0.1 mol (31.0 grams) of triphenyl phosphite, and 0.1 gram of sodium methylate and the mixture heated in the manner of Example 15 to remove the theoretical amount of phenol (18.8 grams). The product was 2-(phenoxy)-9-methyl-9-ethyl-1,3,8,10-tetraoxa-2-phosphaspiro (5,5) undecane.

What is claimed is:

1. A phosphite having one of the formulae

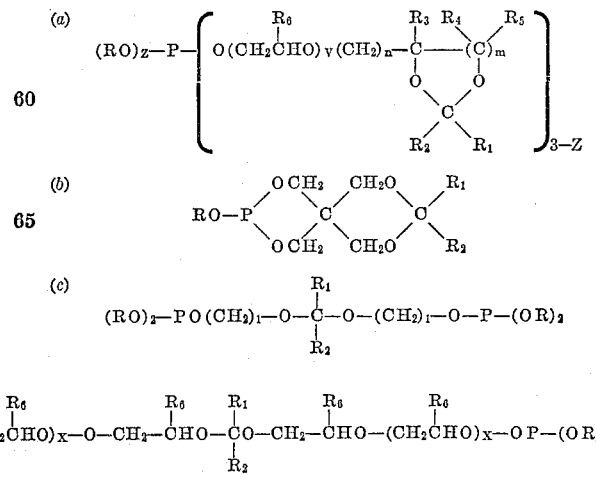

and (e) 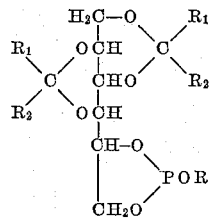

where R is selected from the group consisting of alkyl, alkenyl, phenyl, lower alkyl phenyl, naphthyl and halophenyl, $R_1$ and $R_2$ are selected from the group consisting of hydrogen, alkyl, phenyl, naphthyl, lower alkyl phenyl, halophenyl and nitrophenyl, individually and

together form a cycloalkyl ring of 5 to 6 carbon atoms, $R_3$ is selected from the group consisting of hydrogen, alkyl and phenyl, lower alkyl phenyl, $R_4$ and $R_5$ are selected from the group consisting of hydrogen and alkyl, $R_6$ is selected from the group consisting of hydrogen and 1–2 carbon atom alkyl, V is selected from the group consisting of zero and an integer, $n$ is an integer between 1 and 10 inclusive, $m$ is an integer between 1 and 2 inclusive, 1 is an integer of at least 4, Z is selected from the group consisting of zero, 1 and 2 and X is an integer of at least 1.

2. A process of preparing a poly hydroxyl containing organic phosphite comprising hydrolyzing a phosphite of claim 1.

3.

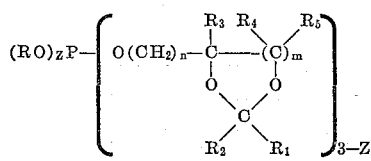

where R is selected from the group consisting of alkyl, alkenyl, phenyl, lower alkyl phenyl and naphthyl, $n$ is an integer between 1 and 3 inclusive, $R_3$ is selected from the group consisting of hydrogen, alkyl, phenyl and lower alkyl phenyl, $R_2$ and $R_5$ are selected from the group consisting of hydrogen and alkyl, $R_1$ and $R_2$ are selected from the group consisting of hydrogen, alkyl, phenyl, lower alkyl phenyl, naphthyl, halophenyl and nitrophenyl individually and

together form a cycloalkyl ring of 5 to 6 carbon atoms, $m$ is an integer between 1 and 2 inclusive and Z is an integer between 0 and 2 inclusive.

4.

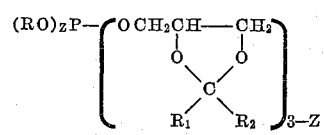

where $R_1$ and $R_2$ are selected from the group consisting of hydrogen, alkyl, phenyl, lower alkyl phenyl and naphthyl, Z is an integer between 0 and 2 inclusive and R is selected from the group consisting of alkyl, alkenyl, phenyl, lower alkyl phenyl and naphthyl.

5. Tris 4-(1,3-dioxacyclopentyl) methyl phosphites having up to 2 alkyl substituents on the number 2 carbon atom.

6. Tris 4-(1,3-dioxacyclopentyl) methyl phosphites having 1 alkyl substituent on the number 2 carbon atom.

7. Tris 4-(1,3-dioxacyclopentyl) methyl phosphites having 2 lower alkyl substituents on the number 2 carbon atom.

8. Mono aryl bis 4-(1,3-dioxacyclopentyl) methyl phosphites having up to 2 alkyl groups attached to the number 2 carbon atom of the dioxacyclopentane ring and wherein the aryl group is selected from the group consisting of phenyl, lower alkyl phenyl and naphthyl.

9. Mono alkyl bis 4-(1,3-dioxacyclopentyl) methyl phosphites having up to 2 alkyl groups attached to the number 2 carbon atom of the dioxacyclopentane ring.

10. Mono phenyl bis 4-(1,3-dioxacyclopentyl) methyl phosphites having 1 to 2 lower alkyl groups attached to the number 2 carbon atom of the dioxacyclopentane ring.

11.

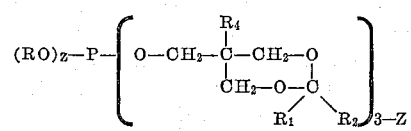

where R is selected from the group consisting of alkyl, alkenyl, phenyl, lower alkyl phenyl and naphthyl, $R_1$ and $R_2$ are selected from the group consisting of hydrogen, alkyl, phenyl, lower alkyl phenyl and naphthyl, $R_4$ is lower alkyl and Z is an integer between 0 and 2 inclusive.

12. Tris 5-(1,3-dioxacylohexyl) methyl phosphites having up to 2 alkyl substituents on the number 2 carbon atom.

13. Tris 5-(5-lower alkyl 1,3-dioxacyclohexyl) methyl phosphites having 1 alkyl substituents on the number 2 carbon atom.

14. Tris 5-(5-lower alkyl 1,3-dioxacyclohexyl) methyl phosphites having 2 lower alkyl substituents on the number 2 carbon atoms.

15. Mono aryl bis 5-(5-lower alkyl, 1,3-dioxacyclohexyl) methyl phosphites having up to 2 alkyl groups attached to the number 2 carbon atom of the dioxacyclohexane ring and wherein the aryl group is selected from the group consisting of phenyl, lower alkyl phenyl and naphthyl.

16. Mono alkyl bis 5-(5-lower alkyl, 1,3-dioxacyclohexyl) methyl phosphites having up to 2 alkyl groups attached to the number 2 carbon atom of the dioxacyclohexane ring.

17. Mono phenyl bis 5-(5-lower alkyl, 1,3-dioxacyclohexyl) methyl phosphites having up to 2 alkyl groups attached to the number 2 carbon atom of the dioxacyclohexane ring.

18.

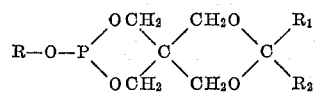

where R is selected from the group consisting of alkyl, alkenyl, phenyl, lower alkyl phenyl and naphthyl and $R_1$ and $R_2$ are selected from the group consisting of hydrogen, alkyl, phenyl, lower alkyl phenyl and naphthyl.

19. 2-aryloxy-9-alkyl-1,3,8,10-tetraoxa-2-phosphaspiro (5,5) undecane and wherein the aryloxy group is selected from the group consisting of phenoxy, lower alkyl phenoxy and naphthoxy.

20. 2-aryloxy-9,9-di lower alkyl 1,3,8,10-tetraoxa-2-phospha-spiro (5,5) undecane and wherein the aryloxy group is selected from the group consisting of phenoxy, lower alkyl phenoxy and naphthoxy.

21. 2-alkoxy-9-alkyl-1,3,8,10-tetraoxa-2-phosphaspiro (5,5) undecane.

22. 2-alkoxy-9,9-di lower alkyl-1,3,8,10-textraoxa-2-phospa-spiro (5,5) undecane.

23.

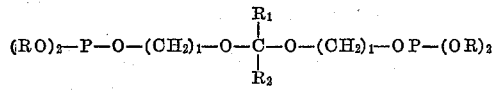

where R is selected from the group consisting of alkyl, alkenyl, phenyl, lower alkyl phenyl and naphthyl, $R_1$ and $R_2$ are selected from the group consisting of hydrogen, alkyl and aryl and 1 is an integer between 4 and 10.

24. Mono hydrocarbon phosphite ester of a di alkylidene hexitol and wherein the hydrocarbon group is selected from the group consisting of alkyl, alkenyl, phenyl, lower alkyl phenyl and naphthyl.

25. 5,6-mono-aryl phosphite ester of 1,3,2,4-dialkylidene sorbitol and wherein the aryl group is selected the group consisting of phenyl, lower alkyl phenyl and naphthyl.

26. A compound having a formula selected from the group consisting of

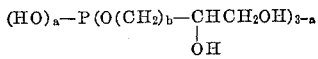

and

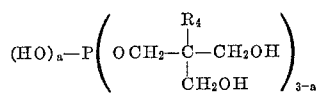

where $a$ is selected from the group consisting of 0, 1 and 2, $b$ is an integer between 1 and 10 inclusive, and $R_4$ is lower alkyl.

27. A compound having the formula

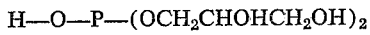

28. A compound having the formula

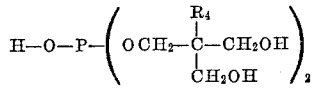

29. A compound having the formula

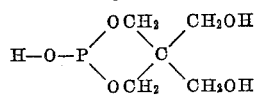

30. A compound having a formula selected from the group consisting of

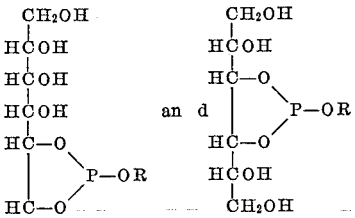

where R is selected from the group consisting of hydrogen and hydrocarbon selected from the group consisting of alkyl, alkenyl, phenyl, lower alkyl phenyl and naphthyl.

31. A compound according to claim 30 where R is hydrogen.

32. A compound having the formula

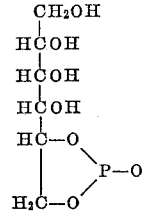

No references cited.